Aug. 26, 1924.
N. FABER
POTATO PLANTER ATTACHMENT FOR CORN PLANTERS
Filed Feb. 26, 1923
1,506,294
6 Sheets-Sheet 6
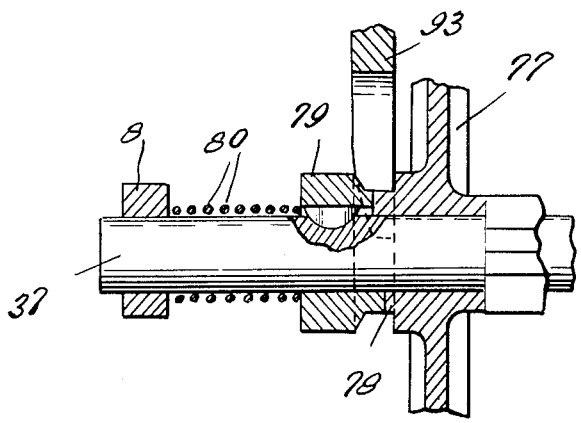
Fig. 7.
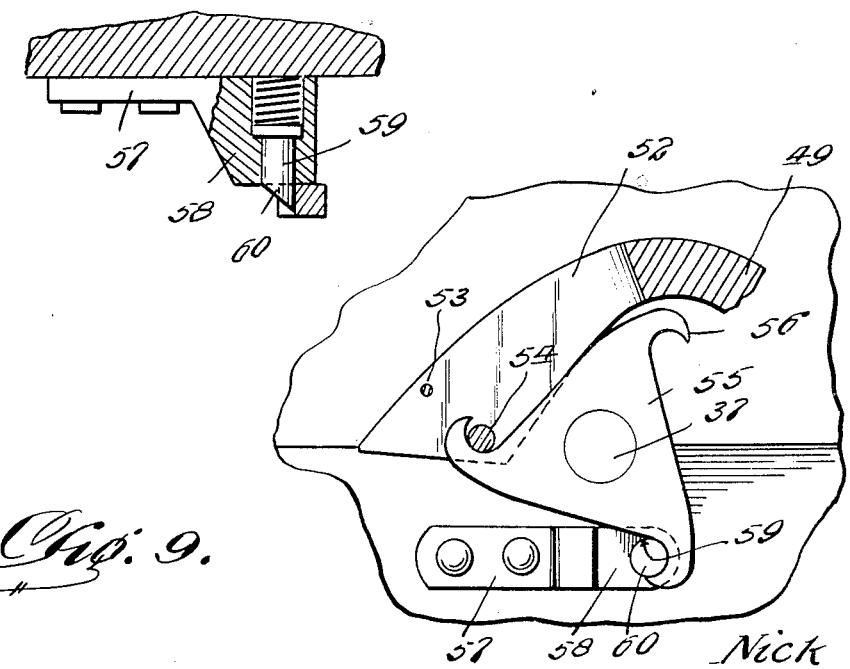
Fig. 8.
Fig. 9.
Witnesses:
F. L. Fox
H. Berman
Nick Faber,
INVENTOR.
BY Clarence A. O'Brien
ATTORNEY.

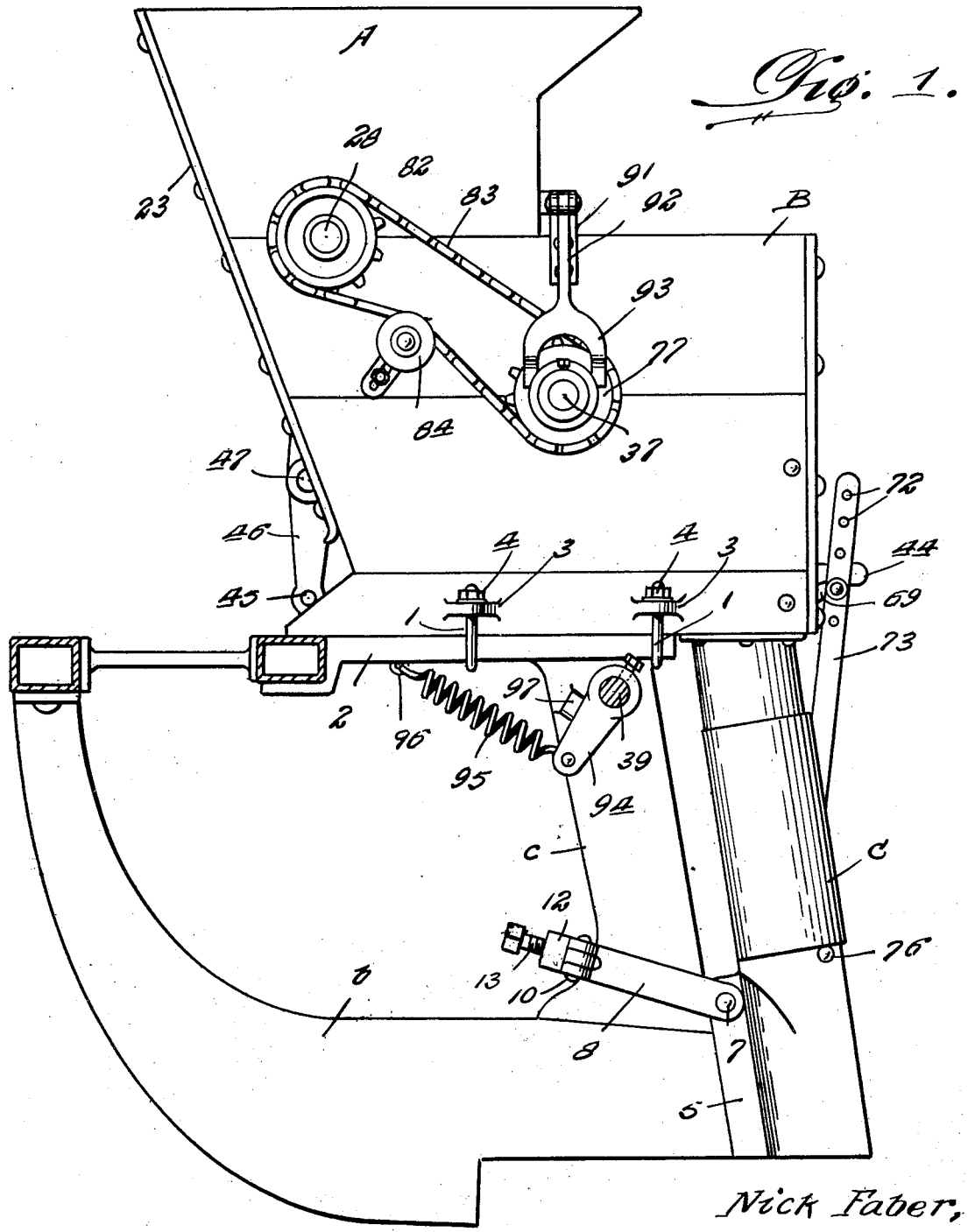

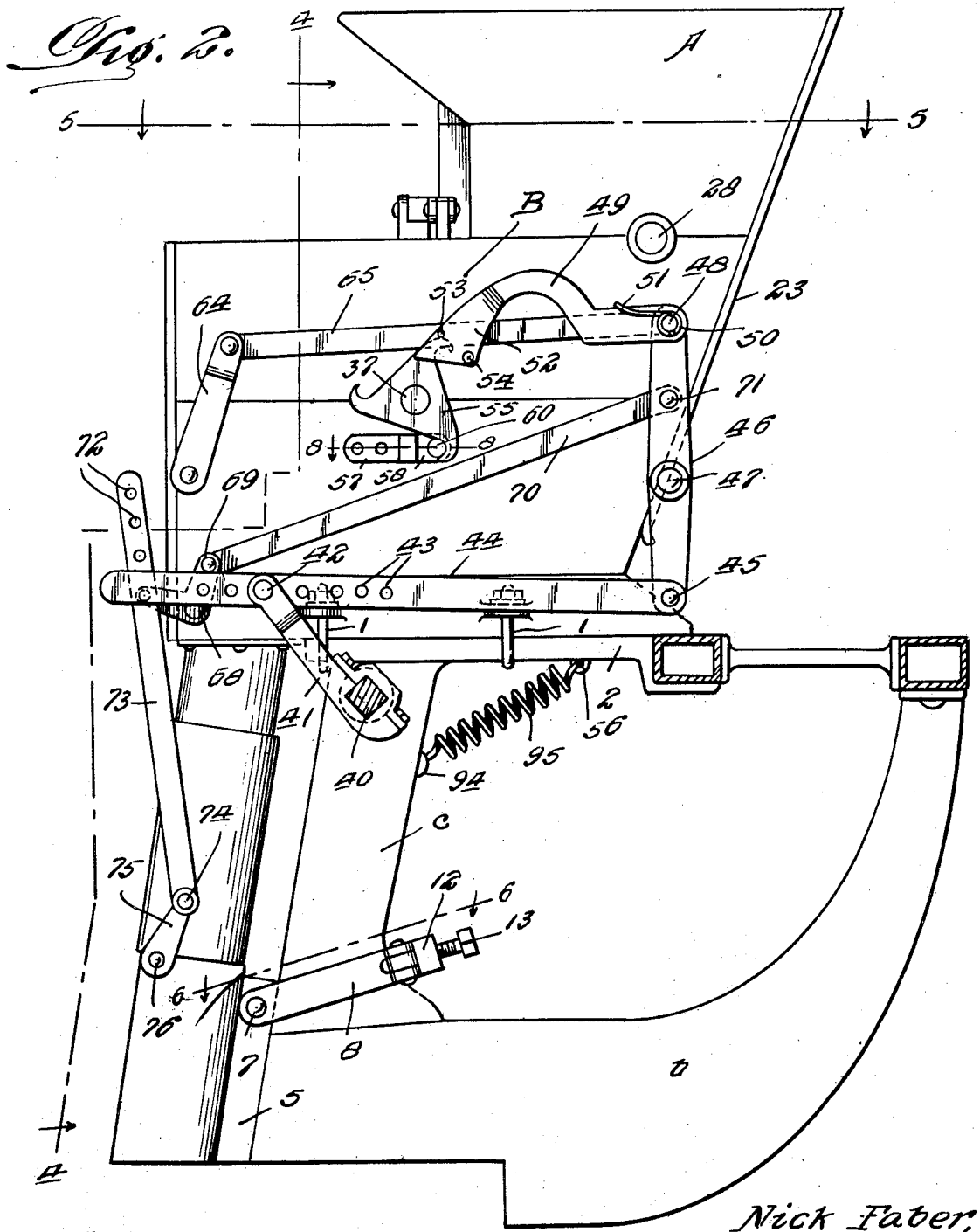

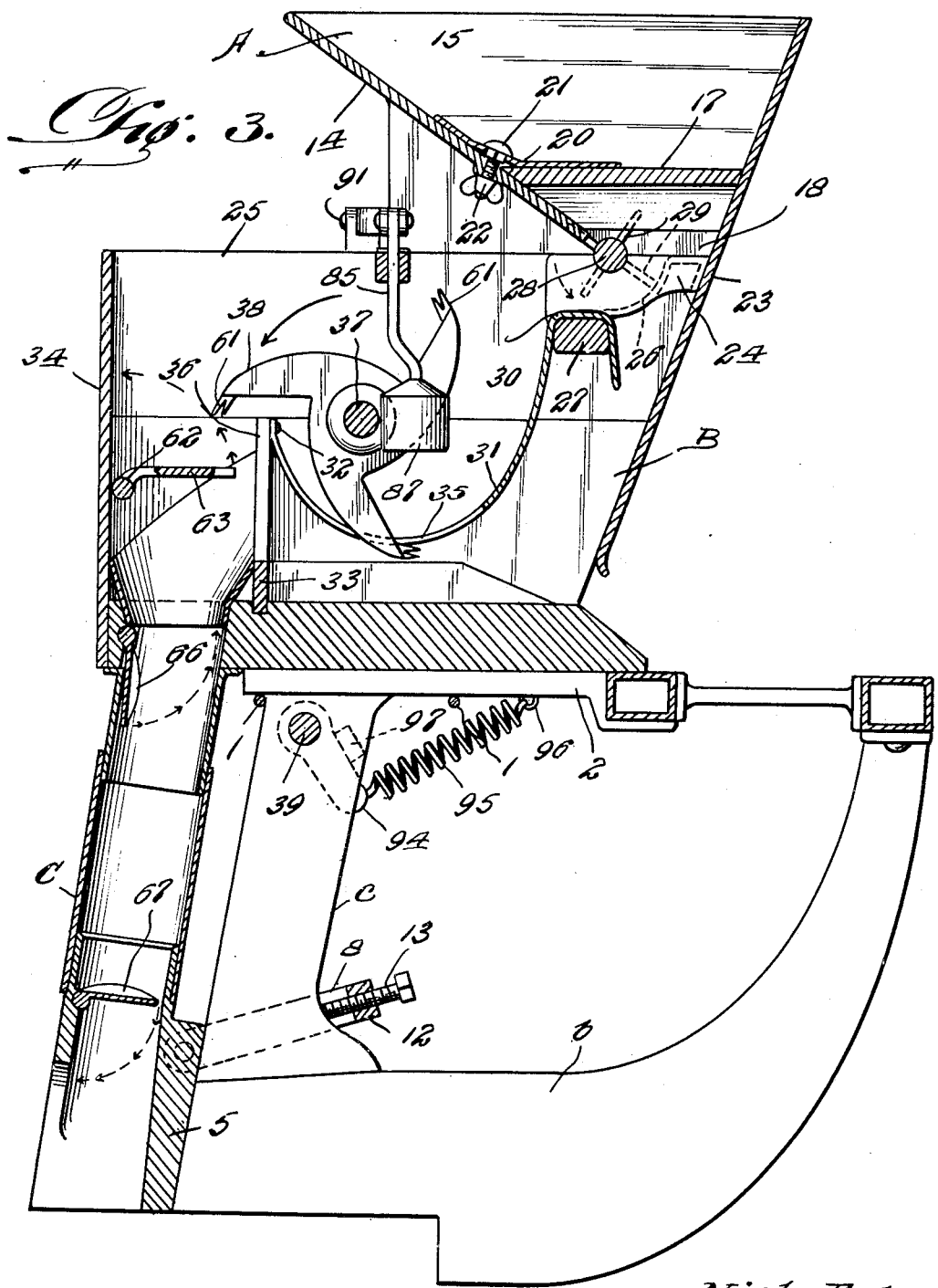

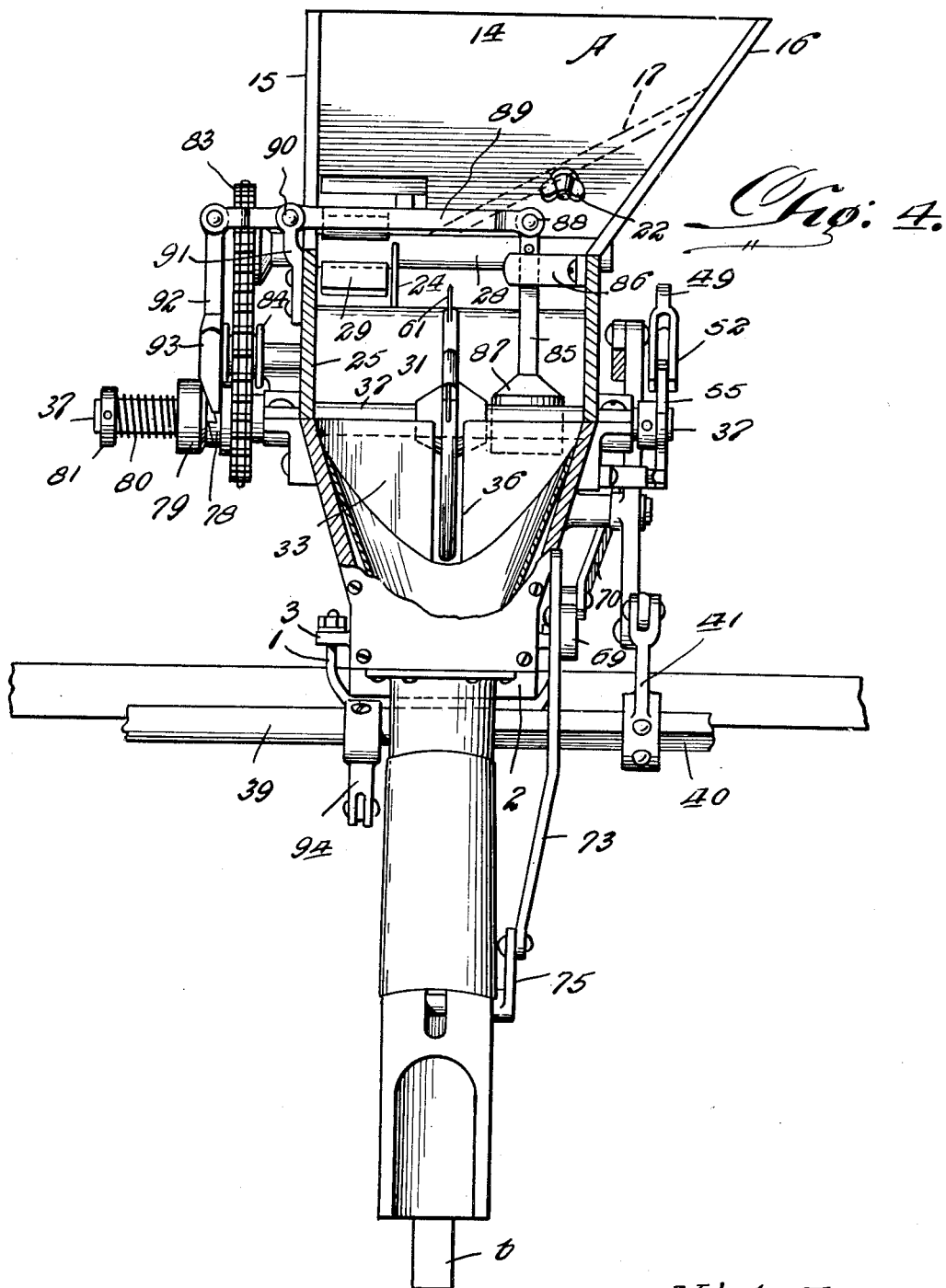

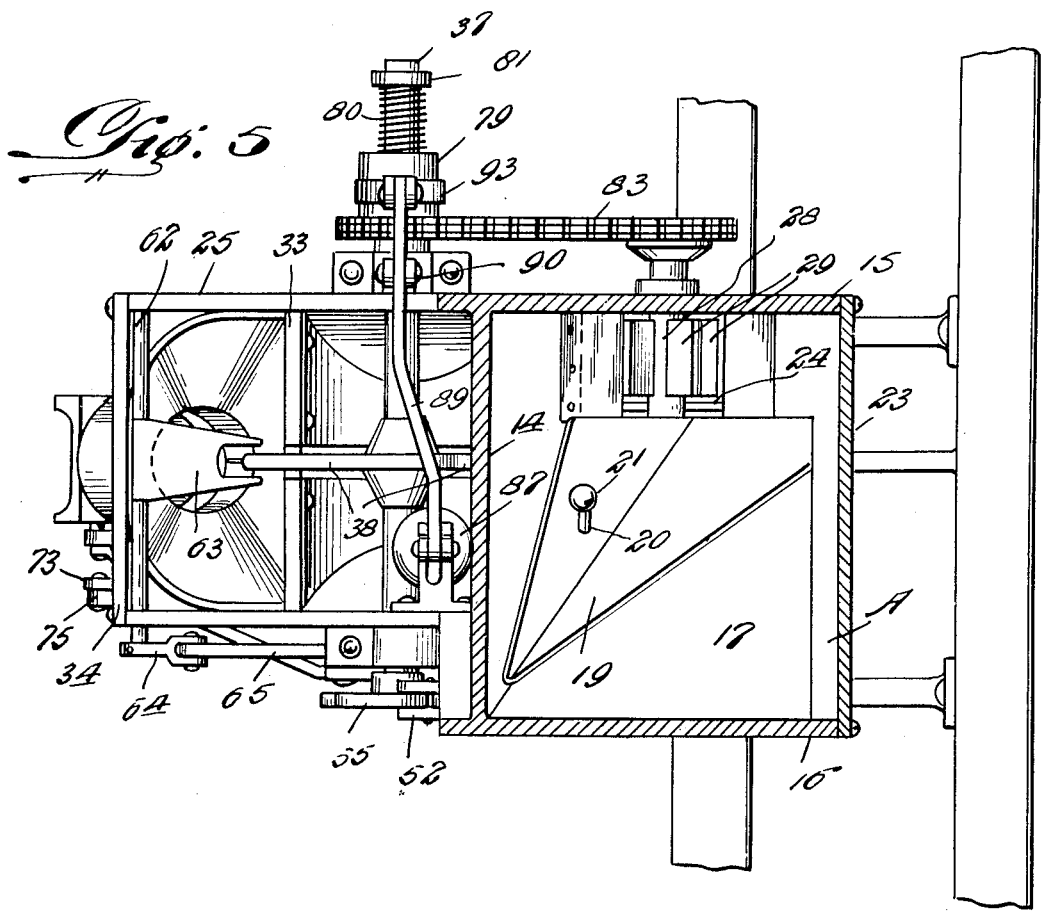
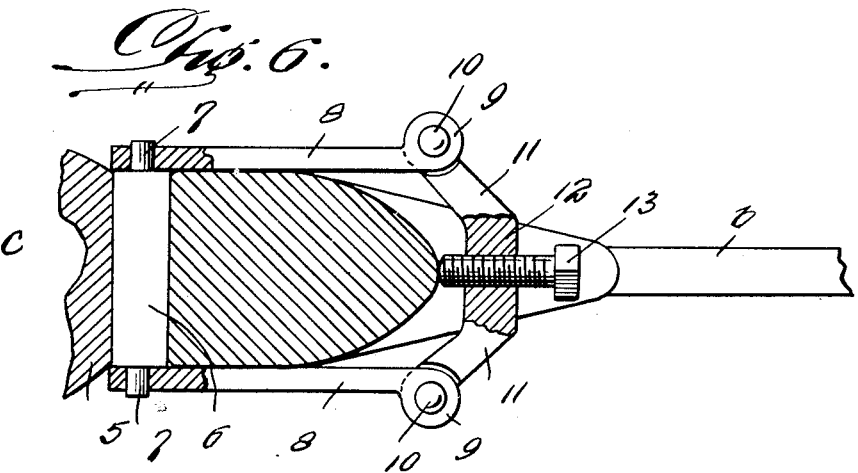

Patented Aug. 26, 1924.

1,506,294

UNITED STATES PATENT OFFICE.

NICK FABER, OF SIOUX CITY, IOWA.

POTATO-PLANTER ATTACHMENT FOR CORN PLANTERS.

Application filed February 26, 1923. Serial No. 621,162.

*To all whom it may concern:*

Be it known that I, NICK FABER, a citizen of the United States, residing at Sioux City, in the county of Woodbury and State of Iowa, have invented certain new and useful Improvements in Potato-Planter Attachments for Corn Planters, of which the following is a specification.

My invention relates to potato planter attachments, adapted for application to corn planters and specifically check-row planters of the single or multiple row type.

The primary object of the present invention resides in the provision of such an attachment whereby the usual corn hoppers, and their seed discharging spouts may be removed from the planter frame and a device constructed in accordance with the present invention provided therefor, which device is adapted to be operated by the usual corn planter mechanism for effectively planting potatoes.

A still further object of the invention is the provision of such a device that may be applied to conventional types of checkrow corn planters in a simple and convenient manner, and when once installed upon the planter frame, the same is not liable to readily become out of order, and further, when desired, my attachment may be removed from the planter, and the usual corn hopper and discharge nozzle may be again installed thereon.

With these general objects in view and others that will appear as the nature of the invention is better understood, the same consists in the novel construction, combination, and arrangement of parts hereinafter more fully described, illustrated in the accompanying drawings, and pointed out in the appended claims.

In the drawings forming part of this application, like numerals of reference indicate similar parts in the several views, and wherein:—

Figure 1—is a side elevational view of a device constructed in accordance with the present invention, the same being shown as applied to the usual supporting structure of the corn hopper.

Figure 2—is a view similar to Figure 1, but showing the opposite side of the device.

Figure 3—is a vertical longitudinal cross sectional view of a potato planter shown in Figures 1 and 2.

Figure 4—is a vertical transverse sectional view, taken substantially upon the broken line 4—4 of Figure 2, and looking in the direction of the arrows.

Figure 5—is a longitudinal sectional view taken upon the line 5—5 of Figure 2, and looking downwardly in the direction of the arrows.

Figure 6—is a cross sectional view upon the line 6—6 of Figure 2, and also looking downwardly in the direction of the arrows.

Figure 7—is a fragmentary cross sectional view of an improved form of clutch mechanism employed in connection with the present invention.

Figure 8—is a fragmentary cross sectional view upon the line 8—8 of Figure 2, and Figure 9—is an enlarged fragmentary side elevational view, partly in cross section of an improved operating means of a potato lifting shaft.

Briefly described, my invention contemplates the provision of a main and auxiliary potato hopper together with a potato outlet nozzle, suitably supported upon or connected to the front end of the auxiliary hopper, these hoppers and discharge spouts adapted for attachment to the corn planter frame at the position usually occupied by the corn hopper after the same has been removed from the frame. In the auxiliary hopper, means are provided for singly removing the potatoes therefrom to be discharged into the outlet spout above mentioned, this means being operated by the usual corn planter operating shaft of the machine.

Referring to the drawings, my device includes the provision of a main hopper A, auxiliary hopper B and outlet spout C connected to the bottom wall of the auxiliary hopper and rearwardly of the usual furrow foot or runner of the planter. These hoppers together with the discharge spout are connected to the frame of the machine, and at a point usually occupied by the corn hopper of the machine. As a means for rigidly supporting my improvement in position upon the frame of the machine, there is provided a spaced pair of U-shaped wire bail members 1, adapted for engagement beneath the usual frame bar 2 of the furrow foot or runner, the legs of these bails adapted to extend upwardly, and to engage through openings in ears 3 formed or otherwise connected to the side walls of the hopper B, and adjacent the lower end thereof. The projecting ends of the legs of these bails are screw threaded for receiving retaining nuts 4. The lower end of the discharge nozzle C is thickened or enlarged as at 5, and one surface thereof is adapted for close contact with the rear end of the planter foot or runner $b$ and the adjacent end of the vertical supporting leg $c$ of this foot or runner. Referring to Figure 6, the upper end of the enlargement 5 of the outlet nozzle C is a transverse relatively short rod 6 extending therethrough, the projecting ends of this rod being reduced as at 7. Loosely engaging over the reduced ends of the rod 6, are links 8, which links extend rearwardly and at both sides of the supporting leg $c$ of the furrow foot or runner $b$. The rear ends of each of the links 8 are eyed as at 9, and pivotally connected as at 10 to these eyed ends of the links 8, are the leg members 11 of a cross plate 12. This cross plate 12 is provided with a central screw threaded opening therethrough adapted for receiving a headed screw threaded bolt 13, the inner end of which is adapted for wedging against the adjacent surface of the before mentioned supporting leg $c$ of the furrow foot or runner $b$. In view of this latter mentioned construction, it will be readily seen that a rigid connection is provided between the potato discharge spout C and the furrow foot or runner.

The main and auxiliary hoppers A and B, respectively, may be and preferably are, integrally joined together as shown in several of the views, and the front wall 14 of the main hopper A preferably slopes inwardly as shown. The inner side wall 15 of this hopper is substantially vertical as more clearly shown in Figure 4, and the opposite side wall 16 slopes downwardly as shown in this figure. The bottom wall 17 of the hopper preferably slopes downwardly and terminates adjacent an outlet 18 in the hopper. Slidably disposed on the inclined front wall and the inclined bottom 17 is an angular plate 19 slotted as at 20, for receiving a headed bolt 21, which bolt is screw threaded for receiving a single nut 22. In view of this plate 19, it will be readily understood that by unscrewing the single nut 22 the plate 19 may be slid forwardly or rearwardly for increasing or diminishing the dimensions of the opening 18 in the hopper A for purposes hereinafter described. Secured in any manner to the rear inclined wall 23 for the hoppers A and B and directly beneath the opening 18 in the main hopper A and at one side thereof, is a shield 24, and between this shield 24 and the vertical side 25 of the hopper B is a curved apron 26 shown in dotted lines in Figure 3, the said shield and apron being supported at the front ends thereof upon a transverse supporting arm 27 in the hopper B. Rotatably supported in notches at the adjacent edges of the hoppers A and B is a transversely disposed shaft 28 having spaced blades 29 formed thereon, and at a point directly beneath the forward end of the opening 18 in the hopper A above the curved apron 26, and between the side wall 25 of the hopper B and the shield 24 supported therein. Positioned over the supporting arm 27 in the hopper B is the rear hooked end 30 of a relatively large concave apron 31, which apron 31 is secured at its front end as at 32 at the upper end of a vertical shield 33 within the hopper B and spaced from the front wall 34 thereof. The concaved apron 31 and vertical shield 33 are provided with alined slots 35 and 36 respectively and rotatably supported within the hopper B and above the apron 31 is a transverse shaft 37, which shaft has keyed thereto a plurality of spaced integrally joined radiating arms 38, these integrally joined arms being supported upon the shaft at a position directly above the slots 35 and 36 in the apron 31, and shield 33.

The usual transversely extending check wire operated shaft 39 is journaled through the upper end of the vertical supporting leg $c$ of the furrow foot or runner $b$ and one projecting end of this shaft is squared as at 40, and adapted to be secured to the squared end of this shaft is one end of a link 41, the upper end of which is pivotally secured as at 42 in any desired one of a number of spaced openings 43 in a longitudinally extending rocking and reciprocating lever 44. The front end of this lever 44 is pivotally secured as at 45 to the lower end of an arm 46, which arm is centrally pivotally secured as at 47 to the suitable support upon the inclined front wall 23 of the hoppers A and B. Pivotally secured to the upper end of this arm 46 as at 48 is the front end of a curved arm 49 and surrounding the pivot 48 between the arms 46 and 49 is a coiled spring 50, one end of which is secured to the pivot 48, and the other end of which extends forwardly as at 51 for engaging upon the upper edge of the adjacent arm 49 for normally tending to force the free inner end of this arm downwardly. The free inner end of the arm 49 is bifurcated as at 52, and extending between the legs forming this bifurcation 52 is a transverse front pin 53 and a transverse rear pin 54.

Upon one projecting end of the shaft 37, transversely disposed in the hopper B and beneath the yoked end 52 of the curved arm 49 there is a substantially triangular plate member 55 shown more clearly in Figure 9. The corners of this triangular plate 55 are hooked as at 56 and engaging with these hooks of the plate is the pin 54 of the yoked end 52 of the curved arm 49. It will therefore be seen that any rocking movement of the check wire operated shaft 40 of the planter will occasion a rocking movement of the arm 46, causing a reciprocatory movement of the curved arm 49, and in view of the pin 54 at the yoked end thereof engaging the hooked portions 56 of the plate 55, it will be readily seen that an intermittent rotation will be imparted to the transverse shaft 37 in the hopper B together with the integral spaced arm 38 keyed thereto. The front pin 53 at the yoked end of the arm 49 engages with the upper surface of the hooked ends 56 of the plate 55 to prevent the yoked end of this arm from disengaging from the said plate 55. As a means for preventing any back movement of the triangular plate 55 and the shaft 37, there is provided upon the adjacent wall of the hopper B, and directly beneath the projecting end of the shaft 37 a bracket 57 enlarged as at 58, and having a spring pressed pin 59 slidably disposed thereon. One face of the projecting end of this pin 59 is bevelled as at 60 for allowing the hooked ends 56 of the plate 55 to ride thereover, the projecting end of this pin adapted for engagement behind the hooked ends of the plate for purposes above set forth.

The outer ends of the spaced integral arms 38 on the shaft 37 are provided with prongs 61 which prongs are adapted to pick up the potatoes from the concaved apron 31 when these arms are rotated in the direction of the arrow shown in Figure 3. Formed upon a rocking shaft 62 within the front end of the hopper B, and journaled between the side walls thereof, is what may be termed a knock-off plate 63, this plate extending forwardly within the hopper as shown, and directly above the inlet end of the potato discharge nozzle C of the hopper B. One end of the rocking shaft 62 projects outwardly of the side wall of the hopper B and has rigidly secured thereto a link 64 to the upper end of which is pivotally secured a rearwardly extending lever 65, the opposite end of this lever being pivotally secured to the upper end of the arm 46 by the pivot 48. This knock-off plate 63 swings in the direction of the arrows, Figure 3, and when the shaft 37 is intermittently rotated to bring one of the arms 38 thereon into a longitudinal position, as shown in this figure, this arm will have a potato impaled upon the forked end 61, and as the rotation of the shaft 37 is stopped, whilst this arm as in this position, a further rearward movement of the upper end of the pivoted arm 46 will occasion a downward swinging movement of the plate 63, so as to knock the potato off of the end of the adjacent arm 38. The potato discharge nozzle C has a gate valve 66 adjacent its upper end and a similar gate valve 67 adjacent its lower end, these valves swinging in the direction of the arrows as shown, and adapted to be alternately opened and closed. The top valve 66 is formed upon a shaft 68, which extends outwardly of the side wall of the hopper B and has a bell crank 69 secured thereto. Pivotally secured to one arm of this bell crank is a lever 70, which lever extends forwardly and upwardly, and is pivotally secured as at 71 to the before described pivoted lever 46. The other arm of this bell crank is pivotally received with any desired one of a series of openings 72 in a downwardly extending lever 73, the lower end of this lever being pivotally secured as at 74 to a link 75. The bottom valve 67 is formed upon a pivot 76, which extends outwardly of the side wall of the discharge nozzle C to be rigidly connected to the said link 75. In view of this latter mentioned construction, it will be readily understood that only one potato at a time will be discharged from the potato spout C, this being due to the fact that when the lower valve 67 is opened for allowing the potato to discharge therefrom, the upper valve 66 will be closed, for receiving thereon a potato which may drop or be knocked off of the forked ends 61 of the arms 38.

The opposite projecting end of the intermittent rotary shaft 37 has loosely disposed thereon and inwardly of the extreme end thereof, a relatively large sprocket gear 77, and as more clearly shown in Figure 7, a clutch collar 78 is formed on this sprocket gear. Slidably keyed to this projecting end of the shaft 37 is a cooperating clutch collar 79 normally engaging with the clutch collar 78 of the gear 77 through the instrumentality of a relatively strong coiled spring 80, this coiled spring being positioned between the clutch collar 79 and another collar 81 keyed to the outer end of the said shaft. The shaft 28 transversely positioned between the hoppers A and B and carrying the spaced blades 29 has keyed or otherwise suitably secured to the outer projecting end thereof, a sprocket wheel 82, and engaging over this sprocket wheel and the sprocket wheel 77 of the shaft 37, is a sprocket chain 83, this chain riding over an idler pulley 84, suitably supported upon the wall 25 of the hopper B. An intermittent rotary movement of the shaft 37 will occasion a similar intermittent rotary movement of the shaft, causing the spaced blades 29 thereon to rotate in the direction of the arrow in Figure 3 for consequently conveying the potatoes from the hopper A onto the concave apron 31 in the hopper B. From this apron 31, the potatoes are lifted therefrom by the forked ends of the arm 38 to be knocked from these arms by the plate 63 for discharging into the outlet nozzle C. Extending downwardly into the hopper B and above the concave apron 31, is a vertically movable arm 85 extending through an opening within a guide bracket 86 secured upon one side wall of the hopper B. This arm 85 is weighted at its lower end as at 87 and the upper end thereof is pivotally secured as at 88 to a transversely extending lever 89 pivoted adjacent its opposite end as at 90 to a bracket 91 supported upon the outer surface of the wall 25 of the hopper B. Pivotally secured to the outer end of this transverse lever 89, is a pendent arm 92 yoked at its bottom as at 93. The outer surface of this yoked end 93 of the pendent arm 92 is bevelled as shown, and this yoked end of the arm is adapted to slidably engage the bevelled face of the sliding clutch collar 79 on the shaft 37 whenever the weighted arm 85 within the hopper B, is forced upwardly for thereby disengaging the sprocket wheel 77 from the shaft 37 for allowing this shaft to rotate without imparting a similar rotary movement to the shaft 28.

The above recited structure has been provided for stopping the rotation of the shaft 28, so as to prevent the feeding of the potatoes from the hopper A, into the hopper B, whenever the latter mentioned hopper has a sufficient number of potatoes therein. It is of course to be understood that the potatoes upon the concave apron 31 will engage beneath the weight 87 of the arm 85 for consequently raising this arm for imparting the above described operation to its associate parts. The check operated shaft 39 on the opposite side of the supporting leg c of the furrow runner b from the squared portion 40 thereof has keyed thereto an arm 94 to which is secured at the lower end thereof, one end of a relatively strong coiled spring 95, the opposite end of this spring being connected at 96 to the upper supporting frame bar 2 of the furrow runner. This spring serves as a means for reversely rocking the shaft 39, so as to allow the same to be again rocked in a forward direction by the check mechanism, and as a means for limiting the reverse rocking movement of this shaft, there is formed upon the supporting leg c, a leg or shoulder 97 adapted to engage with the arm 94 for producing this function.

In view of the above description, it is believed by me the operation and advantages of my device will be readily apparent to those skilled in the art, and while I have herein shown and described the preferred embodiment of the present invention, it is nevertheless to be understood that minor changes may be made therein without departing from the spirit and scope of the invention as claimed.

What I claim as new is:—

1. In a potato planter, a main and an auxiliary hopper, means for feeding the potatoes from the main hopper to the auxiliary hopper, means for selectively removing the potatoes from the auxiliary hopper and being normally operatively connected with the feeding means and means located in the auxiliary hopper and adapted to be operated by the accumulation of the potatoes in the auxiliary hopper to interrupt the operative connection between the potato selecting means and the potato feed means.

2. In a potato planter, a main and an auxiliary hopper, a feeder including a shaft for passing the potatoes from the main hopper to the auxiliary hopper, means for discharging the potatoes selectively from the auxiliary hopper and including a shaft, a clutch controlled driving mechanism operatively connecting said shafts, and means located in the auxiliary hopper and adapted to be operated by the accumulation of the potatoes therein and having connection with the clutch mechanism for disengaging the members of the said mechanism when an excess of the potatoes is accumulated in the auxiliary hopper for interrupting the rotation of the feeder in the main hopper.

3. In a potato planter, a main and an auxiliary hopper, means for feeding the potatoes from the main hopper into the auxiliary hopper, means located in the auxiliary hopper for selectively discharging the potatoes therefrom and including a shaft, means operatively connecting said shaft with the feeder and including a clutch mechanism, a lever fulcrumed upon the hopper and having an end portion disposed transversely within the auxiliary hopper, means connected with the lever for disengaging the members of the clutch mechanism and a weighted arm hanging pendant from the lever and disposed within the auxiliary hopper and spaced above the bottom thereof.

In testimony whereof I affix my signature.

NICK FABER.